United States Patent Office 2,703,332
Patented Mar. 1, 1955

2,703,332

POLY HALO-SALICYLANILIDES

Jakob Bindler, Riehen, near Basel, and Ernst Model, Basel, Switzerland, assignors to J. R. Geigy A. G., Basel, Switzerland, a Swiss firm No Drawing. Application December 23, 1952,
Serial No. 327,670

Claims priority, application Switzerland
December 29, 1951

6 Claims. (Cl. 260—559)

The present invention concerns a process for the production of bactericidal salicylanilides which are very suitable as active ingredients in disinfectants.

It has been found that such salicylanilides which contain two neighbouring halogen substituents in one of the two benzene rings, of which one must be in the para-position to the carbamide bridge and the other in one of the meta-positions, are characterised by particularly strong bactericidal properties. The bactericidal activity is moreover particularly great if the other benzene ring also contains one or more halogen substituents; a halogen substituent in the para-position to the carbamide bridge is particularly active. The halogen substituent can also be in the meta-position provided that there are other halogen substituents, it being of advantage if a second substituent in the anilide radical is in the para-position to the first one. 3.5 dihalogen substitution comes into question in the benzoyl radical. In the present invention it is often of advantage if the trifluoromethyl group replaces a halogen atom in the dihalogen substitution in couples. Also a methyl group can take the place of a halogen atom in the benzoyl radical, advantageously in the 4-position when there is a halogen atom in the 5-position. This active substitution in couples can naturally also take place in the two benzene rings, even so not only is further halogen substitution, particularly in the anilide radical, admissible but often favourable when in the substitution by halogen in couples according to the present invention, a third halogen atom takes one of the remaining positions. The bactericidal salicylanilides according to the present invention are characterised, therefore, by substitution of the benzene rings in couples acording to the following formula:

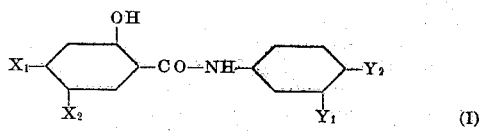

(I)

wherein either $X_1$ and $X_2$ represent halogen or $Y_1$ represents methyl and $X_2$ represents halogen, or $Y_1$ and $Y_2$ represent halogen or $Y_1$ represents the trifluoromethyl group and $Y_2$ represents halogen.

Here and in the following, for technical reasons, preferably chlorine is to be understood by halogen, but also bromine and iodine compounds are active.

The new bactericidal salicylanilides are obtained by reacting acylating derivatives of a 2-hydroxybenzene-1-carboxylic acid which can contain halogen substituents in the positions not next to the carboxyl group in the benzene ring and, if desired, can have a methyl group in the 4- or 5-position to the carboxyl group, with a 5-, or preferably a 4-halogen-1-aminobenzene compound which, with advantage, can contain further halogen substituents or a trifluoromethyl group, the latter in the meta-position to the amino group. If the para-position to the amino group is free, a para-dihalogen substitution of the benzene ring is necessary to obtain a good action. An ortho-position to the amino group must be free in the halogen-aminobenzene compound used whereas the other can be occupied by halogen. The components should be so chosen that the salicylanilides obtained, after saponification of an acyloxy group to the hydroxyl group if necessary, correspond to the general Formula II

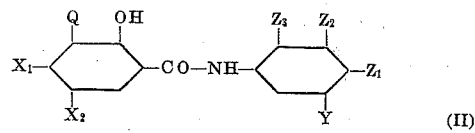

(II)

wherein

Q represents hydrogen or halogen,
X represents hydrogen, halogen or the methyl group,
Y represents hydrogen, halogen or the trifluoromethyl group, and
Z represents hydrogen or halogen, whereby a halogen atom must be present in one of the positions of the anilide radical not neighbouring the amide group and in one of the pairs $X_1X_2$ and $YZ_1$ or $Z_1Z_2$ both symbols must represent substituents of the type defined. Particularly favourable compounds are those in which also $Z_1$ represents halogen in the substitution in couples in $X_1X_2$ or also one X represents halogen in the substitution in couples in $YZ_1$ or $Z_1Z_2$.

In the process according to the present invention suitable acylating derivatives of halogen substituted 2-hydroxybenzene-1-carboxylic acids are the respective acid halides and the corresponding 2-acyloxybenzene-1-carboxylic acid halides: in particular the corresponding acid chlorides come into consideration. If 2-acyloxybenzoyl halides are used then the acyloxy group must finally be saponified under mild conditions to the hydroxyl group, for example with non-caustic alkalies in aqueous or aqueous-organic solution. In the process according to the present invention, it is not necessary to start from the carboxylic acid halides themselves. There is a particularly advantageous method of production already known which consists in heating suitable 2-hydroxybenzoic acids and the halogen-aminobenzene compounds usable according to the present invention in inert organic solvents such as toluene, chlorobenzene, nitrobenzene, kerosene, etc. with dehydrating agents such as phosphorus trichloride or thionyl chloride, advantageously in the presence of small amounts of aluminium chloride.

The following 2-hydroxybenzene-1-carboxylic acids or acylating derivatives thereof usable in the process according to the present invention are: 4- or 5-chloro- or bromo-2-hydroxybenzene-1-carboxylic acid, 3.5-dichloro-, -dibromo- or -di-iodo-2-hydroxybenzene-1-carboxylic acid, 4-methyl-5-chloro- or -iodo- or -bromo-2-hydroxybenzene-1-carboxylic acid, 4.5-dichloro- or -dibromo-2-hydroxybenzene-1-carboxylic acid.

Suitable 4- or 5-halogen-1-aminobenzene compounds are: 4-chloro-, 4-bromo- or 4-iodo-aniline, 2.4- or 2.5-dichloro- or dibromo-aniline, 2.4.5-trichloro-aniline, 3.4-dichloro-aniline, 3-trifluoromethyl-4-chloro-aniline, 2.3.4-trichloro-aniline and 3.4.5-trichloroaniline are particularly suitable components.

The salicylanilides according to this invention are colourless powders which in aqueous-alkaline solutions of strong alkalies are easily soluble, even in the cold. They have very good bactericidal properties and are suitable, therefore, either as such or mixed with other substances such as cleaning agents, ointment bases, creams, etc. for the disinfection of material treated with such preparations.

The following examples illustrate the invention without limiting it in any way. Where not otherwise stated, parts are given as parts by weight and the temperatures are in degrees centigrade. The relationship of parts by weight to parts by volume is as that of kilogrammes to litres.

EXAMPLE 1

*5-chlorosalicylic acid-3'.4'-dichloro-anilide*

43 parts of 5-chlorosalicylic acid and 40 parts of 3,4-dichloroaniline are dissolved in 450 parts of chlorobenzene and 1 part of aluminium chloride and 15 parts of phosphorus trichloride are added. This suspension is boiled until no more hydrogen chloride is generated, which is about for 2–3 hours. The chlorobenzene solution is then mixed with water and made alkaline to brilliant yellow with soda. The chlorobenzene is removed by the introduction of steam and the distillation residue, after filtering and drying, is recrystallised from chlorobenzene. The new anilide melts at 246–248°.

Similar compounds are obtained if instead of 5-chlorosalicyclic acid, 3.5-dibromosalicylic acid is used or in both cases instead of 3.4-dichloro-aniline, 3.4-dibromo-aniline is used.

EXAMPLE 2

*4.5-dichlorosalicylic acid-3'.4'-dichloro-anilide*

185 parts of the sodium salt of 3.4-dichlorophenol are dried in an autoclave for 3 hours at 100–110° under reduced pressure. After cooling to 35–40°, $CO_2$ under 8 atmospheres pressure is introduced until the pressure remains constant. The whole is then heated for 6 hours at 150–160°. The contents of the autoclave when cooled are taken up in 1000 parts by volume of water and the 4.5-dichlorosalicylic acid is precipitated with hydrochloric acid. After recrystallisation from diluted alcohol, it melts at 206–207°.

21 parts of 4.5-dichlorosalicylic acid are mixed with 50 parts of benzene and 50 parts of acetic acid anhydride. A trace of a mixture of sulphuric acid and glacial acetic acid is added and the whole is heated to 80–90°. After cooling, the crystals are filtered off under suction and then washed with a little benzene and water and dried. 2-acetoxy-4.5-dichlorobenzoic acid is obtained in the form of white crystals. M. P. 163–165°.

21.5 parts of 4.5-dichloro-2-acetoxybenzoic acid are stirred with 30 parts of freshly distilled thionyl chloride, 0.1 part of pyridine in 1 part of benzene is added. The whole is stirred at 45–50° until the reaction is complete. Finally the whole is diluted with a little benzene and then evaporated to dryness at 50–60° under reduced pressure.

The raw acid chloride which is obtained, a pale yellowish oil, is suspended in 400 parts by volume of chlorobenzene and boiled with 16 parts of 3.4-dichloroaniline in an oil bath until no more hydrogen chloride is generated. The reaction mixture is then poured into water and made alkaline. The solvent is removed with steam at the same time as the acetyl group is saponified. The 4.5-dichlorosalicylic acid-3'.4'-dichloroanilide so obtained is recrystallised from glacial acetic acid. M. P. 258–259°.

EXAMPLE 3

*4.5-dichlorosalicylic acid-2'.4'-dichloro-anilide*

21 parts of 4.5-dichlorosalicylic acid and 16 parts of 2.4-dichloro-aniline are dissolved in 400 parts of chlorobenzene and 0.5 part of aluminium chloride and 6 parts of phosphorus trichloride are added. This suspension is boiled until no more hydrogen chloride is generated, which is for about 2–3 hours. The chlorobenzene solution is then mixed with water and is made alkaline to brilliant yellow with soda. The chlorobenzene is removed with steam and the distillation residue is recrystallised from glacial acetic acid. The new anilide melts at 232–233°.

EXAMPLE 4

*4.5-dichlorosalicylic acid-2'.3'.4'-trichloro-anilide*

21 parts of 4.5-dichloro-2-hydroxybenzene-1-carboxylic acid, 0.4 part of anhydrous aluminium chloride and 19.5 parts of 2.3.4-trichloro-aniline are suspended in 400 parts by volume of chlorobenzene. 6 parts of phosphorus trichloride are added. The mixture is boiled until a clear solution is obtained and until no more hydrogen chloride is generated. The filtered solution is neutralised with soda, the chlorobenzene is removed with steam and the residue is filtered off. The 4.5-dichloro-2-hydroxybenzoyl-2'.3'.4'-trichloro-anilide melts at 254–255° after recrystallisation from ethylene glycol monomethyl ether.

EXAMPLE 5

*5-chlorosalicylic acid-2'.3'-4'-trichloranilide*

18 parts of 5-chloro-2-hydroxybenzene-1-carboxylic acid, 19.5 parts of 2.3.4-trichloro-aniline, 0.4 part of aluminium chloride and 6 parts of phosphorus trichloride are suspended in 400 parts by volume of chlorobenzene and boiled until a clear solution is obtained. The solution is filtered hot, neutralised with soda and the solvent is removed with steam. The 5-chloro-2-hydroxybenzoyl-2'.3'.4'-trichloro-anilide, recrystallised from ethylene glycol monomethyl ether, melts at 248–249°.

If, instead of 5-chloro-2-hydroxybenzene-1-carboxylic acid, the corresponding 5-bromine compound is used and the reaction product is recrystallised from butyl alcohol, 5-bromo-2-hydroxy-benzoyl-2'.3'.4' - trichloro - anilide is obtained which melts at 245–246°.

EXAMPLE 6

*3.5-dichlorosalicylic acid-2'.3'.4'-trichloro-anilide*

21 parts of 3.5-dichloro-2-hydroxybenzene-1-carboxylic acid, 0.4 part of aluminium chloride and 6 parts of phosphorus trichloride are added to a solution of 19.5 parts of 2.3.4-trichloroaniline in 400 parts of chlorobenzene. The suspension so obtained is boiled until no more hydrogen chloride is generated. Slight amounts of undissolved substances are filtered off from the solution, the filtrate is neutralised with soda solution and the chlorobenzene is removed with steam. After filtering and recrystallisation from ethylene glycol monomethyl ether, 3.5-dichloro-2-hydroxybenzoyl-2'.3'.4'-trichloro-anilide is obtained which melts at 224–225°.

The salicylanilides given in the following table are prepared in a manner analogous to those described in the examples. Their bactericidal properties are determined on *Staphylococcus aureus* as follows:

A standard suspension, which is prepared by adding sterilised tap water to the germs of 16 hour agar cultures, the density of which is brought to 85% transparency in the so-called Hellige Bio-Photo-Col apparatus, is mixed with graduated dilutions of the disinfectant to be tested (in aqueous solution). Duration of test: 10 minutes, temperature: 20°.

At the end of the 10 minutes, 2 sub-cultures from each reaction mixture are prepared with a glucose broth. The sub-cultures are bred at 37° C. After 48 hours, the development or sterility of the sub-cultures is determined. The bactericidal activity of a disinfectant is determined by the minimal concentration required to kill, with certainty, a standard suspension of test germs under certain conditions. The minimal concentration having a bactericidal action is ascertained by graduated concentrations according to the dilution process principle and is expressed in $10^{-6}$ mol.

TABLE

| No. | Halogenated salicylic acid | Halogenated aniline | M. P., (degrees) | Minimal active bactericidal concentration expressed in $10^{-6}$ mol. |
|---|---|---|---|---|
| 1 | 5-chlorosalicylic acid | 3,4-dichloroaniline | 246–248 | 6.25 |
| 2 | do | 3-trifluoromethyl-4-chloro-aniline | 229–230 | 6.25 |
| 3 | do | 3.4.5-trichloro-aniline | 283–284 | 3.1 |
| 4 | do | 2.4.5-trichloro-aniline | 219–221 | 6.6 |
| 5 | 4-chlorosalicylic acid | 3.4-dichloro-aniline | 221–222 | 12.5 |
| 6 | do | 3.4.5-trichloro-aniline | 261–262 | 3.1 |
| 7 | do | 2.4.5-trichloro-aniline | 251–252 | 6.1 |
| 8 | do | 3-trifluoromethyl-4-chloro-aniline | 183–184 | 12.5 |
| 9 | 3.5-dichloro-salicylic acid | 2.4.5-trichloro-aniline | 185–186 | 10 |
| 10 | do | 3.4.5-trichloro-aniline | 185 | 3.1 |
| 11 | do | 3-trifluoromethyl-4-chloro-aniline | 134–135 | 12.5 |
| 12 | 3.5-di-iodo-salicylic acid | 3.4-dichloro-aniline | 198–199 | 6.6 |
| 13 | do | 3.4.5-trichloro-aniline | 222–223 | 3.0 |

TABLE—Continued

| No. | Halogenated salicylic acid | Halogenated aniline | M. P., (degrees) | Minimal active bactericidal concentration expressed in $10^{-5}$ mol. |
|---|---|---|---|---|
| 14 | 4.5-dichloro-salicylic acid | 3.4-dichloro-aniline | 258–259 | 3.1 |
| 15 | ----do---- | 2.4.5-trichloro-aniline | 223–224 | 12.5 |
| 16 | ----do---- | 3.4.5-trichloro-aniline | 276–277 | 3.1 |
| 17 | 4.5-dichloro-salicylic acid | 3-trifluoromethyl-4-chloro-aniline | 225–226 | 6.25 |
| 18 | 4-methyl-5-chloro-salicylic acid | 3.4-dichloro-aniline | 280–281 | 6 |
| 19 | ----do---- | 3.4.5-trichloro-aniline | 275–276 | 3.0 |
| 20 | ----do---- | 3-trifluoromethyl-4-chloro-aniline | 195–196 | 3.0 |
| 21 | 5-bromo-salicylic acid | 3.4-dichloro-aniline | 237–238 | 6.2 |
| 22 | ----do---- | 3.4.5-trichloro-aniline | 277–278 | 3.1 |
| 23 | 4.5-dichloro-salicylic acid | 2.4-dichloro-aniline | 232–233 | 6.6 |
| 24 | ----do---- | 2.5-dichloro-aniline | 222–223 | 6.6 |
| 25 | ----do---- | 4-chloro-aniline | 258–259 | 3.1 |
| 26 | ----do---- | 2.4-dibromo-aniline | 229–230 | 3.1 |
| 27 | ----do---- | 4-bromo-aniline | 257–258 | 6.2 |
| 28 | ----do---- | 2.3.4-trichloro-aniline | 254–255 | 3.1 |
| 29 | 5-chloro-salicylic acid | ----do---- | 248–249 | 3.1 |
| 30 | salicylic acid | 3.4.5-trichloro-aniline | 257–258 | 12.5 |

EXAMPLE 7

100 parts of dyed or undyed cotton are impregnated with a solution obtained by dissolving 2–5 parts of a salicylanilide obtained according to Example 1 in 50 parts by volume of ethyl alcohol with the aid of a few drops of caustic soda lye 30% and then diluting the clear solution with water up to 1000 parts. The cotton is left in the solution for 15–30 minutes at 30–50° whereupon it is wrung out and dried.

The cellulose fibres so treated have an increased resistance to mould and against rot caused by micro-organisms.

What we claim is:

1. A polyhalogen-substituted salicylanilide containing at least three halogenous substituents in the X-positions, of the general formula:

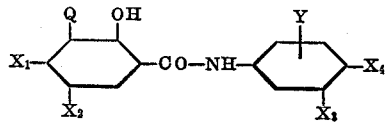

wherein Q represents a member selected from the group consisting of hydrogen, chlorine, bromine and iodine, $X_1$ and $X_2$ each represent a member selected from the group consisting of hydrogen, chlorine, bromine, iodine and $CH_3$, $X_3$ represents a member selected from the group consisting of hydrogen, chlorine, bromine and $CF_3$, and $X_4$ and Y each represent a member selected from the group consisting of hydrogen, chlorine and bromine.

2. A salicylanilide of the formula:

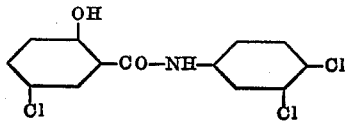

3. A salicylanilide of the formula:

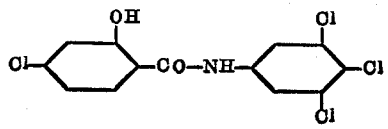

4. A salicylanilide of the formula:

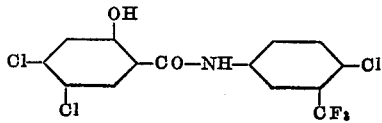

5. A salicylanilide of the formula:

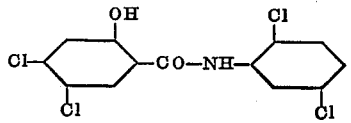

6. A salicylanilide of the formula:

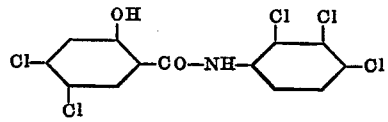

References Cited in the file of this patent

UNITED STATES PATENTS 2,047,513  Laska et al. _____ July 14, 1936
2,410,397  Weiss et al. _____ Oct. 29, 1946

OTHER REFERENCES

Hirwe et al., "J. Indian Chem. Soc.," vol. 16 (1939), pp. 281–284.

Allan et al., "Organic Synthesis," vol. 26 (1946), pp. 92–94.

Anschutz et al., "Liebigs Annalen," vol. 346 (1906), pp. 305, 314, 326 and 332.